July 23, 1940.          B. H. CALLY          2,208,789
SOLAR WATER HEATER
Filed April 20, 1939          2 Sheets-Sheet 1

Inventor
Benjamin Harrison Cally
By Shepherd & Campbell
Attorneys

July 23, 1940. B. H. CALLY 2,208,789
SOLAR WATER HEATER
Filed April 20, 1939 2 Sheets-Sheet 2

Inventor
Benjamin Harrison Cally
By Shepherd & Campbell
Attorney

Patented July 23, 1940

2,208,789

UNITED STATES PATENT OFFICE 2,208,789

SOLAR WATER HEATER

Benjamin Harrison Cally, Miami, Fla.

Application April 20, 1939, Serial No. 268,931

2 Claims. (Cl. 126—271)

This invention relates to improvements in solar water heaters such as are largely used in warm climates for heating water for domestic use by the sun's rays.

Conventional solar water heaters of this type usually consist of a system of pipes or tubes arranged in a flat formation, housed in a shallow frame one side of which is covered with glass and this side of the unit is exposed to the rays of the sun so that the system of pipes inside the frame absorb heat from the sun's rays and impart this heat to water contained therein, the water being supplied to the bottom of the heating pipes by a pipe connection from the bottom of a tank containing the water which is to be heated. Another such pipe connection is made from the top of this system of heating pipes to the top of the water storage tank and as the water is heated in the heating pipes a natural circulation, caused by the natural tendency of heated water to rise, takes place in such manner that the water heated by the heater is conveyed to, and stored in, the top of the storage tank where it remains until the entire tank of water is heated, at which time another such cycle begins and circulation and heating continue as long as the sun shines on the heater.

Water does not circulate well through small tubes and the longer the tubes are, the more this circulation is retarded, yet water is more efficiently heated by the sun by passing through a number of small tubes than by passing through one tube large enough to carry the same quantity.

It is an object of this invention to take advantage of the increased heating efficiency offered by using smaller tubing in the heating unit than has heretofore been thought practicable.

It is another object to decrease the size of a heating unit of any given capacity by virtue of the added efficiency and by so doing reduce the cost of construction and installation.

It is an important object of the invention to produce a heating unit for solar water heaters having the advantages above recited for small tubes but wherein the parts are so related and united that despite the small size of tubes the unit is made so strong and rigid as to last a very long time without attention.

The novelty of this invention resides in the construction of a heating unit in such a manner that smaller heating tubes may be used than have ever been used before and in joining said tubes with header pipes of larger diameter in such manner that the speed of circulation will be any predetermined speed deemed necessary for proper heating of the water.

In the drawings; Fig. 1 is a face view of the heating element consisting of the relatively large headers and the much smaller connecting tubes.

Like reference characters designate corresponding parts throughout the several figures of the drawings.

Figure 4:
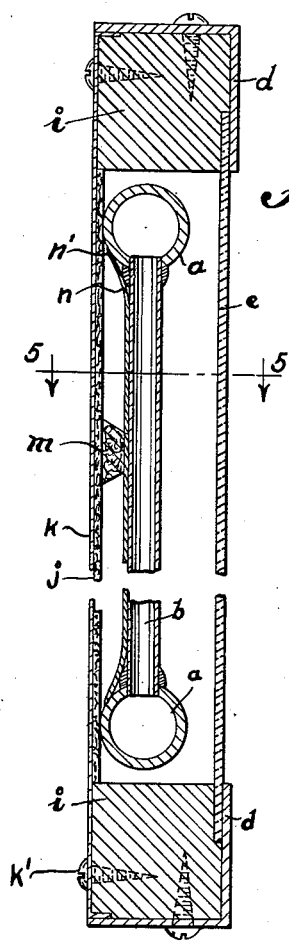
Fig. 4 is a vertical sectional view partly broken away through the structure of Fig. 2.
Figure 5:
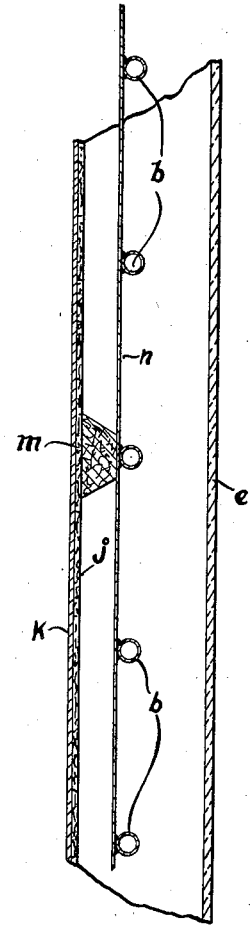
Fig. 5 is a fragmentary horizontal sectional view upon line 5—5 of Fig. 4.

Referring to the drawings; two ¾ inch manifold or header pipes $a$—$a$ are joined and interconnected by a relatively large number of ¼ inch O. D. copper tubes $b$. A sheet of heat-absorbing metal (shown at $n$ in Figs. 4 and 5) is fitted and attached to one side of this tube structure and the whole structure, each tube and header, is completely soldered to the sheet of metal $n$. The manner in which this sheet of metal is soldered at its ends to the headers $a$ is indicated at $n'$ in Fig. 4. This structure, to wit, the headers, tubes, and sheet $n$ all tied together by the soldering of the ends of the sheet to the headers, and the soldering of the intermediate portions of the tubes $b$ to the sheet $n$, is what I shall refer to hereinafter as the heating element or unit, and is the part of a solar water heater to which this invention relates. The sheet $n$ is preferably of copper and thus functions to absorb heat from the sun's rays and transmit it to the tubes $b$ and the water flowing in said tubes.

Figure 1:
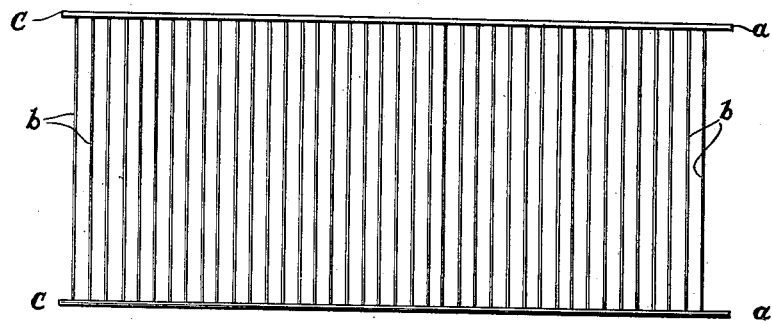
Figure 2:
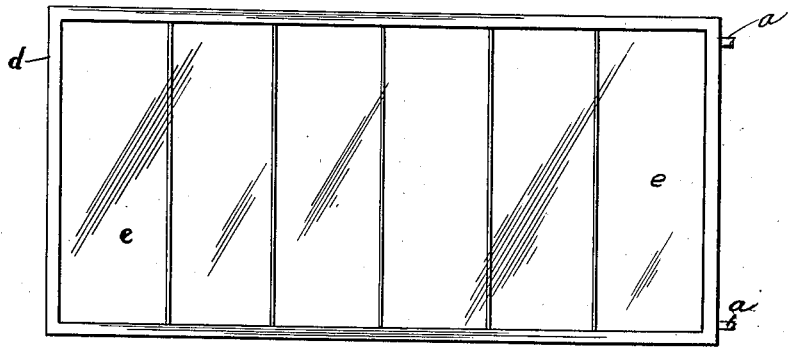
Fig. 2 is a face view of the glass-covered supporting frame within which the structure of Fig. 1 is received.

This heating element or unit is mounted in a glass-covered structure comprising the rectangular wooden frame $i$ from an end of which the ends of the header pipes $a$—$a$ protrude as shown in Fig. 2. The lower header receives the water to be heated and the heated water is discharged from the upper header.

Figure 3:
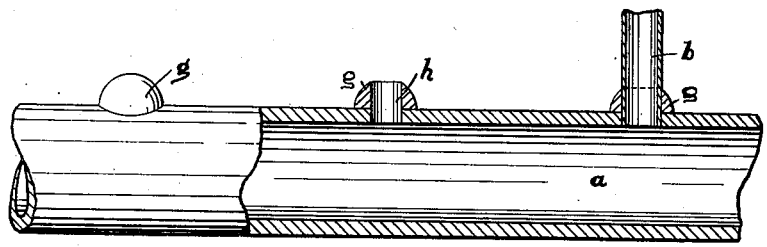
Fig. 3 is an enlarged longitudinal sectional view through one of the headers illustrating the manner of uniting the tubes and headers.

The tubes may be connected to the headers in various ways. However, I have, in Fig. 3, shown a highly desirable method of assembling the tubes and headers, by virtue of which I am able to make the whole structure very strong and rigid despite the small diameter of the tubes and thinness of the metal from which they are made. In the construction of Fig. 3, the header, shown as actual size, in part, has lumps of metal g fused onto its outer wall for thickening the wall of the header at the points of juncture of the tubes therewith. These lumps should be of a metal having a relatively high point of fusion and an affinity for soft solder, such as brass or bronze. Holes are drilled through the lumps and through the header wall as shown at h. The ends of the tubes b are then inserted in these holes, flame is applied to the joint and by coating with flux and applying solder, a permanent sweat joint is formed.

It might be thought that it would be possible to unite the tubes and headers by ordinary screw threads, but this is not the case. In the first place the copper tubes would not be strong enough to receive the screw threads. In the second place the thickness of the walls of the headers would not be sufficient to give a reasonable degree of bearing of the tubes therein and in the third place it would be necessary to employ right and left-hand threads at the opposite ends of the tubes. If the latter were attempted tight joints could not be had because it would be almost certain that one tube would become tight before its neighboring tube. By virtue of the highly desirable arrangement shown in Fig. 3, the relatively fragile tubes b are given a long bearing in the header walls and protuberances or lumps; they are all made equally tight by the sweat joints; the parts may be easily slipped into assembled relation before the solder is applied and then when the metal sheet n is soldered to the intermediate portions of the tubes and then soldered at its ends to the headers, the whole assembly is brought into such interlocked and braced relation as to render it extremely strong.

The heating element or unit just above described, as before stated, is mounted within the frame i, a glass cover composed of panes e—e for this frame is held in place by angle irons d, and the back of the frame i is closed by a panel k that is held in place by screws k'. An asbestos or other insulating sheet j is disposed inwardly of the panel, m designates a quantity of asbestos plaster or the like used to form a bearing carrying the weight of the small tubes b and the metal sheet n to which they are attached, holding them in partial suspension, so that they may not lose their heat by sagging and coming into contact with the cooler back wall.

In the construction of the heating element the length of each of the small tubes is just the distance that water will flow at circulating speed through such tubes and acquire approximately all of the heat which the sun will impart to it. This of course can only be approximate and need not be exact, for if the tube be shorter the circulation will be faster and the water will acquire the necessary degree of heat by soon making the second circuit through the heater. Tubes longer than a length as determined above are superfluous, slow down the circulation, and some efficiency is lost by their use.

When the heater is working each of the small tubes is functioning as a unit, completely heating its share of water to the desired temperature and adding it to the quantity heated by the other tubes and flowing through the upper header pipe on its way to the tank.

It is to be understood that the invention is not limited to the precise construction set forth but that it includes within its purview whatever changes fairly come within either the terms or the spirit of the appended claims.

Having described my invention what I claim is:

1. A solar water heater comprising a supporting glass-covered frame and means for supporting the same in an inclined position, a heating element within the frame and beneath the glass, said heating element being composed of a pair of headers extending substantially horizontally through the frame, one at the upper and the other at the lower side thereof, a multiplicity of tubes lying substantially at right angles to and being connected at their ends in radial relation to said headers, means for closing the back of said frame, the said headers lying in relatively close proximity to the back of the frame, and the said tubes being formed of thin material and being of much smaller diameter than the said headers so that the said tubes are caused to lie in materially spaced relation to the back of the frame, a sheet of heat absorbing material intimately united to all of said tubes throughout the major portions of their lengths, the ends of said sheet being bent to bowed formation and intimately united with the said headers, whereby said sheet is caused to serve the double function of absorbing heat from the sun's rays and transferring it to the tubes and headers and of serving as an arch formation to support the intermediate portions of the tubes from the relatively rigid, larger diameter, headers.

2. In a heating unit for solar heaters a pair of spaced pipes constituting headers, a plurality of relatively thin metal tubes of much smaller diameter than the headers spanning the space between said headers, said headers having external reinforcing protuberances of metal of a higher fusion point than solder disposed at spaced points along their length, and drilled for the slidable reception of the ends of said tubes, a backing sheet of heat-absorbing metal of an amplitude to extend between and partially overlap said headers and to underlie all of said tubes, the major portion of said sheet contacting said tubes throughout the major portion of their length and being directed away from said tubes adjacent the ends of the sheet to permit said sheet to overlap and be attached to the headers, said sheet being soldered to the tubes throughout their contacting portions and being likewise soldered to the headers at its points of contact therewith and the ends of the tubes being soldered as by sweating within the said protuberances and thereby to the said headers, so that the whole is caused to comprise a strong, rigid and integral heating unit in which the spans of the thin and relatively fragile tubes are supported and braced from the headers through the medium of the heat-absorbing metallic sheet.

BENJAMIN HARRISON CALLY.